United States Patent
Rupp

(10) Patent No.: US 8,093,495 B2
(45) Date of Patent: Jan. 10, 2012

(54) INSULATED ELECTRICAL BOX

(75) Inventor: Bradford D. Rupp, Quincy, MI (US)

(73) Assignee: Allied Moulded Products, Inc., Bryan, OH (US)

(*) Notice: Subject to any disclaimer, the term of this patent is extended or adjusted under 35 U.S.C. 154(b) by 495 days.

(21) Appl. No.: 12/342,156

(22) Filed: Dec. 23, 2008

(65) Prior Publication Data

US 2009/0166052 A1    Jul. 2, 2009

Related U.S. Application Data

(60) Provisional application No. 61/017,269, filed on Dec. 28, 2007.

(51) Int. Cl.
*H05K 5/00* (2006.01)

(52) U.S. Cl. .............. 174/50; 174/54; 174/58; 439/535; 248/906

(58) Field of Classification Search .............. 174/50, 174/58, 54; 439/535; 220/4.02; 248/906
See application file for complete search history.

(56) References Cited

U.S. PATENT DOCUMENTS

| | | | |
|---|---|---|---|
| 1,526,366 A * | 2/1925 | Old ................................ 338/184 |
| 2,076,650 A | 4/1937 | Kettron | |
| 2,588,270 A | 4/1952 | Miller et al. | |
| 2,997,575 A | 8/1961 | Schwartz | |
| 3,125,388 A * | 3/1964 | Costantini ..................... 312/400 |
| 3,837,521 A | 9/1974 | Huston et al. | |
| 4,082,915 A * | 4/1978 | Silver .............................. 174/51 |
| 4,579,756 A | 4/1986 | Edgel | |
| 4,667,840 A * | 5/1987 | Lindsey ......................... 220/3.2 |
| 4,673,097 A | 6/1987 | Schuldt | |
| 5,104,700 A | 4/1992 | Peterson | |
| 5,486,650 A * | 1/1996 | Yetter ............................. 174/53 |
| 6,147,304 A | 11/2000 | Doherty | |
| 6,239,365 B1 | 5/2001 | McEvers | |
| 6,423,897 B1 * | 7/2002 | Roesch et al. .................. 174/50 |
| 6,820,760 B2 | 11/2004 | Wegner et al. | |
| 6,956,168 B2 * | 10/2005 | Herth ............................. 174/53 |
| 7,002,076 B2 | 2/2006 | Ungerman et al. | |
| 7,283,366 B2 | 10/2007 | Yamashita | |
| 2008/0011501 A1 | 1/2008 | Gates et al. | |
| 2009/0114413 A1 | 5/2009 | Daviau | |
| 2009/0188916 A1 | 7/2009 | Daviau | |

OTHER PUBLICATIONS

The "Insulated Electrical Box" by William A. Daviau, Insulation Business Consultants, Brevard, NC.

* cited by examiner

*Primary Examiner* — Dhirubhai R Patel

(74) *Attorney, Agent, or Firm* — Fraser Clemens Martin & Miller LLC; J. Douglas Miller

(57) ABSTRACT

An electrical box is disclosed, wherein the electrical box includes a back panel and an insulating material disposed thereon. The insulating material reduces the heat transfer through the back panel of the electrical box.

7 Claims, 1 Drawing Sheet

INSULATED ELECTRICAL BOX

CROSS-REFERENCE TO RELATED APPLICATION

This application claims the benefit of U.S. Provisional Patent Application Ser. No. 61/017,269 filed on Dec. 28, 2007.

FIELD OF THE INVENTION

The present invention relates to an electrical box and more particularly to an electrical box having thermally insulating properties.

BACKGROUND OF THE INVENTION

Typically, an electrical box is used to enclose, support and contain electrical devices and wiring in a convenient manner. The electrical box protects the electrical devices and wiring contained therein. A cover plate is typically provided to protect the wiring and electrical devices and associated electrical devices to militate against accidental electrocution of a user. The electrical box is typically connected to and supported by a wall stud or ceiling joist or other structural component of a building.

In some instances, the electrical box is connected to the wall joist of a thermally insulated wall such as the exterior wall of a building, for example. The thermally insulated wall is adapted to militate against heat transfer. However, when the electrical box is disposed within the insulated wall, the electrical box displaces or compresses the insulating material which reduces the insulating properties of the wall at the location of the electrical box. The thermal insulating properties of the materials typically employed to form an electrical box such as metal, fiber glass reinforced polyester, or polyvinyl chloride, for example, are less than the thermal insulating properties of the insulation typically disposed within the wall. Accordingly, the typical electrical box creates a location of increased heat transfer through the wall causing additional energy to be consumed to maintain a desired temperature in the interior of the building.

It would be desirable to produce an electrical box having insulating properties effective to militate against heat transfer through the electrical box.

SUMMARY OF THE INVENTION

Compatible and attuned with the present invention, an electrical box having insulating properties effective to militate against heat transfer through the electrical box, has surprisingly been discovered.

In one embodiment, an electrical box comprises a back wall having an inner surface and a coextensive outer surface; a side wall extending outwardly from the inner surface of the back wall; and an insulating material disposed on one of the inner surface and the outer surface of the back wall to reduce heat transfer therethrough.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
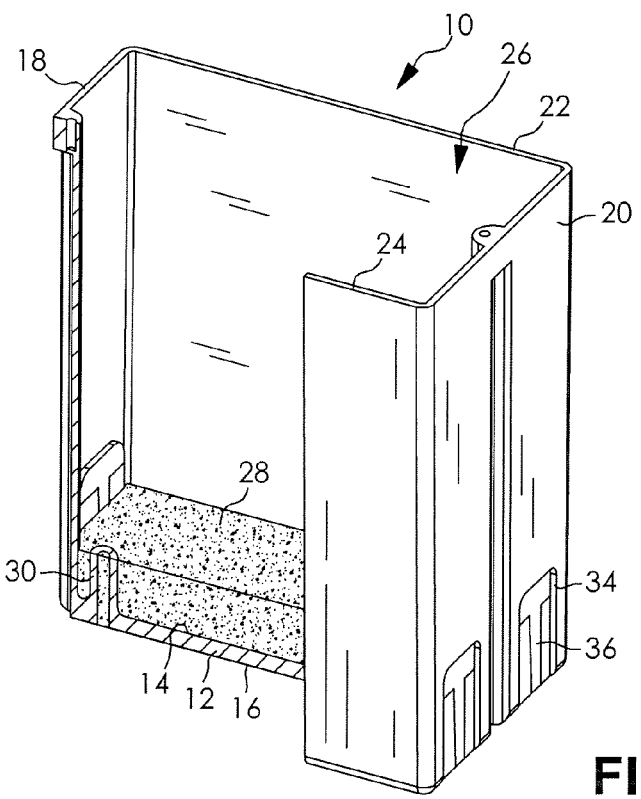
FIG. 1 is a perspective view of an electrical box with a portion cut-away to more clearly illustrate an embodiment of the invention.

FIG. 1 illustrates an electrical box 10 according to an embodiment of the invention. The electrical box 10 includes a back wall 12 having an inner surface 14 and a coextensive outer surface 16. A first pair of opposing side walls 18, 20, and a second pair of opposing side walls 22, 24 extend outwardly from the inner surface 14 of the back wall 12 adjacent the peripheral edge thereof. The side walls 18, 20, 22, and 24 cooperate to form a wall circumscribing the periphery of the back wall 12. The back wall 12 and the side walls 18, 20, 22, and 24 define an interior space of the electrical box 10 with an opening 26 communicating with the interior space of the electrical box 10. In the illustrated embodiment the back wall 12 and the side walls 18, 20, 22, and 24 form a generally rectangularly shaped electrical box. It should be understood that the back wall 12 and the side walls 18, 20, 22, and 24 can have other configurations, as desired, to provide alternate overall shapes to the electrical box 10 such as a circularly shaped electrical box, for example.

A thermal insulating material 28 is disposed on the inner surface 14 of the back wall 12 of the electrical box 10 to reduce heat transfer therethrough. The insulating material 28 has a selected thickness and contacts selected portions of the side walls 18, 20, 22, 24 adjacent the inner surface 14 of the back wall 12. It should be understood that the insulating material 28 and a thickness thereof can be selected to provide a desired insulating value, typically referred to as an R value, to the back wall 12 of the electrical box 10.

At least one hollow cylindrical element 30 extends outwardly from the inner surface 14 of the back wall 12 a distance substantially equal to the thickness of the insulating material 28. The element 30 is adapted to receive a fastener such as a nail or a screw, for example, to attach the electrical box 10 to an adjacent support such as a wall or wall stud, for example. The insulating material 28 covers and fills the element 30 and is adapted to allow the fastener to penetrate therethrough and be received by the adjacent support member. The element 30 militates against a head of the fastener from being driven into the insulating material 28. It should be understood that the electrical box 10 can be provided with other means to attach the electrical box 10 to the support such as attachment wings or attachment straps, for example, that are typically employed for prior art electrical boxes.

Apertures 34 are formed in the side walls 18, 20, respectively, to provide for the passage of electrical wires to the interior space of the electrical box 10. The apertures 34 are provided with knock-out covers 36, which substantially cover the apertures 34. The knock-out covers 36 can be selectively removed or knocked off the electrical box 10 to allow electrical wires to pass through the apertures 34. It should be understood that apertures can be formed in any of the side walls 18, 20, 22, 24, and additional or fewer apertures can be formed, to provide for the passage of electrical wires or fasteners through the side walls 18, 20, 22, 24. It should be understood that the insulating material 28 can be formed to cover a portion or substantially all of any apertures formed in the side walls 18, 20, 22, 24 of the electrical box 10. Electrical wires and fasteners can be caused to penetrate through the insulating material 28 covering the apertures. The insulating material 28 can be adapted to surround the respective electrical wires and fasteners passing therethrough to reduce air flow through the aperture.

Figure 2:
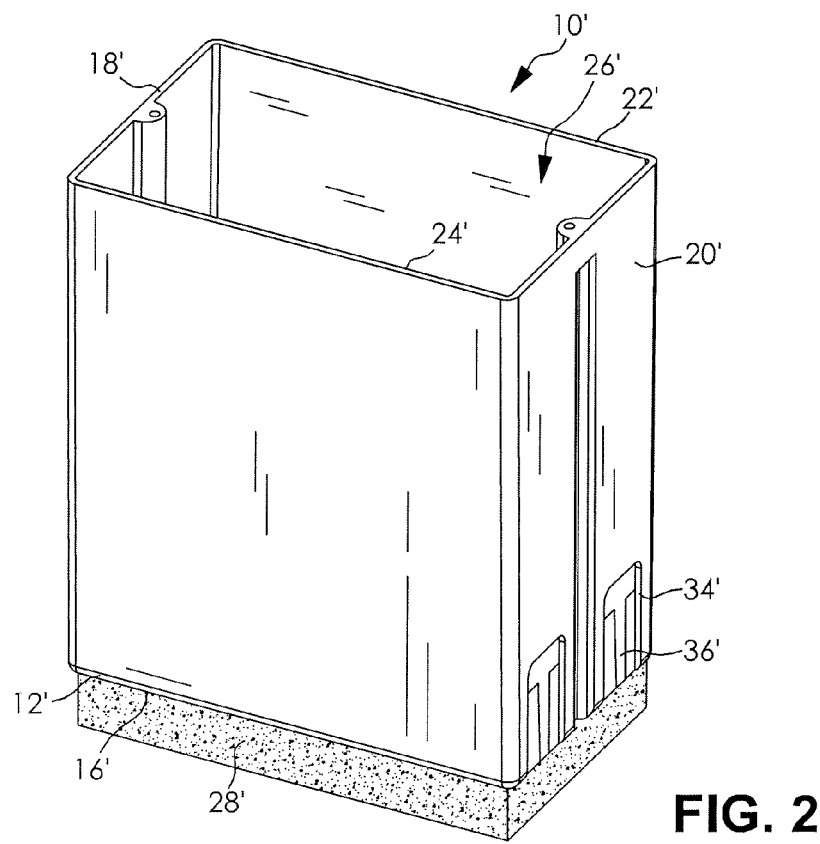
FIG. 2 is a perspective view of an electrical box illustrating another embodiment of the invention.

FIG. 2 illustrates an alternative embodiment of the electrical box 10. Structure similar to that illustrated in FIG. 1 includes the same reference numeral and a prime (') symbol for clarity. In FIG. 2, the insulating material 28' is disposed on the outer surface 16' of the back wall 12' of the electrical box 10'. It should be understood that the insulating material 28' can be provided to cover a selected portion of the outer surface of the side walls 18', 20', 22', 24'. Further, it should be understood that the insulating material 28 can be disposed on both the inner surface 14' and the outer surface 16' of the electrical box 10'.

Favorable results have been obtained by forming the electrical box 10 from fiber glass reinforced polyester or polyvinyl chloride produced by an injection molding process. It should be understood that the electrical box 10 can be formed from other materials and by other manufacturing processes such as forming from metal employing a metal stamping process, for example.

Favorable results have been obtained employing a foamed insulating material 28 such as polystyrene, polyurethane, or polyisocyanurate, for example. It should be understood that other insulating materials can be used as desired that have suitable insulating properties such as fiber glass, urea formaldehyde, and phenolic foam, for example. Additionally, it should be understood that the insulating material 28 can be provided in mats, wherein pieces of insulation are cut to size therefrom and attached to the electrical box 10; preformed to a desired size and attached to the electrical box 10; or dispensed from a source of liquefied or foaming insulation to the electrical box 10 and cured or dried in situ.

In use, a technician typically secures the electrical box 10 to a support member such as a stud in an insulated exterior wall of a building, for example.

The technician typically removes at least a portion of the insulating material in the wall, or compresses the insulating material in the wall located behind back wall 12 of the electrical box 10 to accommodate the electrical box 10. Alternatively, when the electrical box 10 is attached to the support member prior to the installation of the wall insulation, the presence of the electrical box 10 makes it difficult to insulate behind the electrical box 10 causing the insulation behind the electrical box 10 to be omitted; or the displacement of at least a portion of the wall insulating material behind the electrical box 10; or the compression of the wall insulating material placed behind the electrical box 10.

The reduced amount or absence of insulating material, or the compression of the insulating material behind the back wall 12 of the electrical box 10 reduces the insulating property of the wall at the electrical box 10 as compared to other locations in the wall where there is no electrical box. The insulating material 28 attached to the back wall 12 of the electrical box 10 increases the thermal insulating property of the back wall 12. The increased thermal insulating property of the back wall 12 offsets the reduction of the insulating value of the wall that results from the absence of or the reduced amount of wall insulation, or the compression of the wall insulation behind the back wall 12 of the electrical box 10. Further, the wall insulation is caused to contact and surround the outer wall of the electrical box 10 to militate against heat transfer through the wall of the electrical box 10. The electrical box 10 and the wall insulation cooperate to minimize heat transfer between the interior of the building and the outside atmosphere.

The insulated electrical box 10 provides a back wall 12 having increased insulating properties as compared to typical prior art electrical boxes. The electrical box 10 militate against heat transfer through an insulated wall of a building at the location of the electrical box 10. Accordingly, the energy required to maintain a desired temperature in the interior of the building is minimized.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An electrical box comprising:
a back wall having an inner surface and a coextensive outer surface;
at least one side wall extending outwardly from the inner surface of the back wall, the at least one side wall forming an outer wall circumscribing a periphery of the back wall, wherein the at least one side wall includes at least one aperture formed therein, and wherein the back wall and the at least one side wall define an interior space of the electrical box to receive an electrical device therein; and
an insulating material disposed on the inner surface of the back wall within the interior space of the electrical box to minimize heat transfer therethrough, wherein the insulating material covers at least a portion of the at least one aperture formed in the at least one side wall.

2. The electrical box according to claim 1, wherein at least one hollow cylindrical element is formed in the back wall and extends outwardly from the inner surface of the back wall.

3. The electrical box according to claim 2, wherein the hollow cylindrical element is adapted to receive a fastener.

4. The electrical box according to claim 2, wherein the insulating material covers the hollow cylindrical element formed in the back wall.

5. The electrical box according to claim 2, wherein the insulating material fills the hollow cylindrical element formed in the back wall.

6. The electrical box according to claim 1, wherein the electrical box is formed of one of a fiber glass reinforced polyester, a polyvinyl chloride, and a metal.

7. The electrical box according to claim 1, wherein the insulating material is one of a fiber glass, a polystyrene, a polyurethane, urea formaldehyde, phenolic foam, and a polyisocyanurate.

* * * * *